Nov. 3, 1959 C. E. NIXON 2,910,821
APPARATUS FOR APPLYING FLEXIBLE PLASTIC TAPE TO CONDUCTORS
Filed Sept. 2, 1954 2 Sheets-Sheet 1
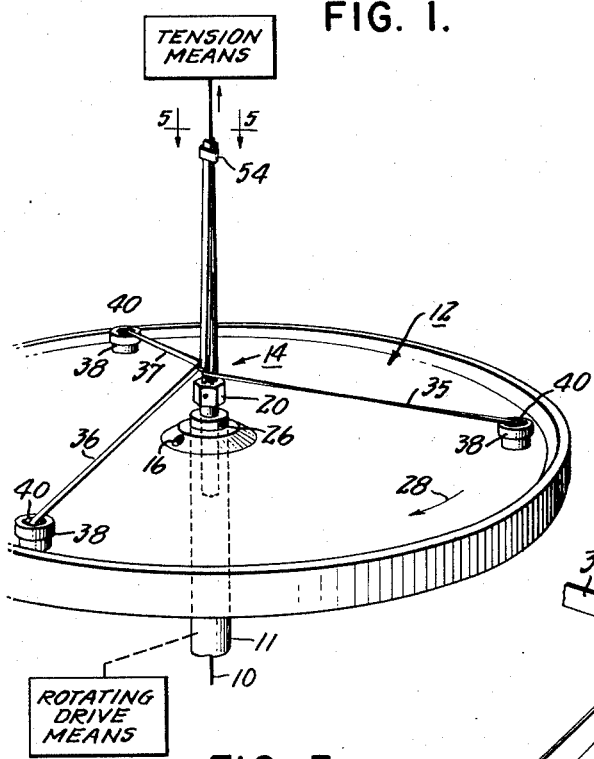
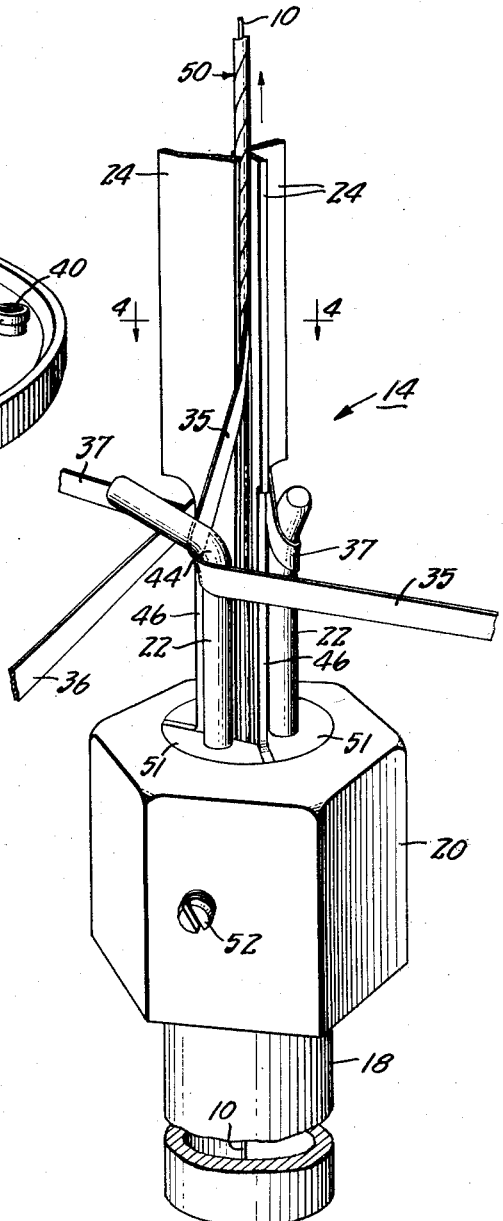
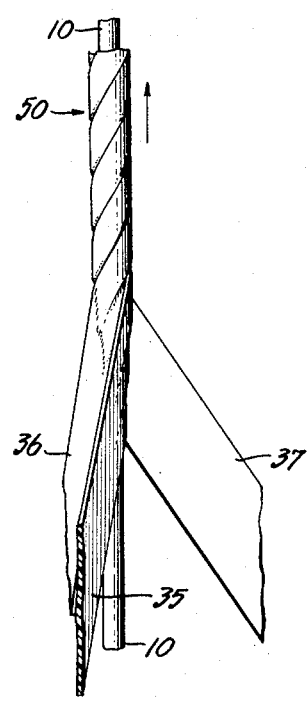
INVENTOR
CHARLES E. NIXON
BY
Curtis, Morris & Safford.
ATTORNEYS Nov. 3, 1959                    C. E. NIXON                    2,910,821
APPARATUS FOR APPLYING FLEXIBLE PLASTIC TAPE TO CONDUCTORS
Filed Sept. 2, 1954                                    2 Sheets-Sheet 2

INVENTOR
CHARLES E. NIXON
BY
Curtis, Morris & Safford
ATTORNEYS

2,910,821

APPARATUS FOR APPLYING FLEXIBLE PLASTIC TAPE TO CONDUCTORS

Charles E. Nixon, Sayville, N.Y., assignor to Adam Consolidated Industries, Inc., New York, N.Y., a corporation of New York Application September 2, 1954, Serial No. 453,852

6 Claims. (Cl. 57—15)

The present invention relates to apparatus for insulating electrical conductors and more particularly to apparatus for wrapping tapes of flexible plastic insulation material around conductors.

Among the advantages of the present invention are those resulting from the fact that it enables a tape or tapes of flexible resin insulation material to be helically wrapped around a conductor at high speed to form an integral insulation layer around the conductor. It enables a conductor to be wrapped with a single continuous tape or with a number of such tapes, but is particularly advantageous for use when two or more tapes are simultaneously applied to the conductor so that they form an insulation layer in which portions of each tape overlie and underlie portions of other tapes.

An advantage of the apparatus described in applying a plurality of tapes to a conductor is that every tape is simultaneously fed toward the conductor, with each tape being fed independently of any other tape. No engagement of the tapes with each other occurs until after at least one is firmly in place on the wire. Every portion of every tape over which portions of another tape are to be wrapped is firmly in place on the conductor before being covered by the next succceeding tape. The result is that every turn of every tape is accurately laid in place and thereafter held in place on the conductor with the amount of overlap between tapes accurately predetermined, usually arranged to be uniform in all tapes. This accurate uniform overlap is particularly advantageous when a "tracer" of contrasting color is being formed by the use of at least two tapes of different color. The edge portion of the contrasting tape which lies at the surface of the insulation layer forms a helical tracer of uniform width extending the full length of the wire. This tracer is integral with the insulation often extending from the inner to the outer surfaces of the insulation, making the wire easy to identify and to trace throughout a circuit The tape forming the tracer can be of the same material as the other tape or tapes in the insulation, thus advantageously providing homogeneous electrical properties in the insulation layer.

The conductor taping apparatus described is particularly advantageous for use with unfused tapes of polytetrafluorethylene, for these synthetic resin tapes become unduly stretched even at very low values of tension, of the order of about 250 pounds per square inch of cross section of the tape. When such tapes are stretched, even at this low value of tension, large numbers of minute voids are created in the tape, many having their long axes extending in the direction of stretch. After being wrapped on the conductor, this unfused tape is fused to form an integral insulation layer. During fusing this polytetrafluorethylene tape shrinks, if it is unrestrained, the amount of shrinkage being particularly great in the transverse direction. These voids have the effect of allowing the individual areas of the tape between the voids to shrink in an unrestrained fashion during fusion. Where the voids are elongated in the direction of stretch, the areas of the tape which shrink transversely in unrestrained fashion may be relatively large. Also, where the voids are initially large and close together, the areas of material between them may be completely pulled apart during fusion, leaving further enlarged holes in the insulation.

The conductor taping apparatus described accurately control and distribute the tension in the insulation tapes as they are wrapped around the wire so that no part of the cross section of any tape is unduly stretched. The edge portions of all the tapes which are to overlie other tape portions may be pre-stretched very slightly relative to the opposite edge portions which are to be wrapped more closely adjacent the conductor. The apparatus described controls the positions of the tapes with respect to each other in accordance with such pre-stretching to provide a uniform degree of overlap in all of the tapes, where desired, and particularly for tracer wire. An impervious integral insulation layer is thus formed.

The various aspects, objects and advantages of the present invention will be understood from the following description considered in conjunction with the accompanying drawings, in which:

Figure 1 is a perspective view of apparatus embodying the present invention for wrapping insulation tapes around a conductor;

Figure 2 is a perspective view, on enlarged scale, of the center portion of Figure 1 showing more clearly the way insulation tape is wrapped around the moving conductor;

Figure 3 is a perspective view, on further enlarged scale, other portions of the apparatus being omitted to show more clearly the conductor with adjacent lengths of the insulation tapes before, during, and after wrapping of the tapes around the conductor;

Figure 4:
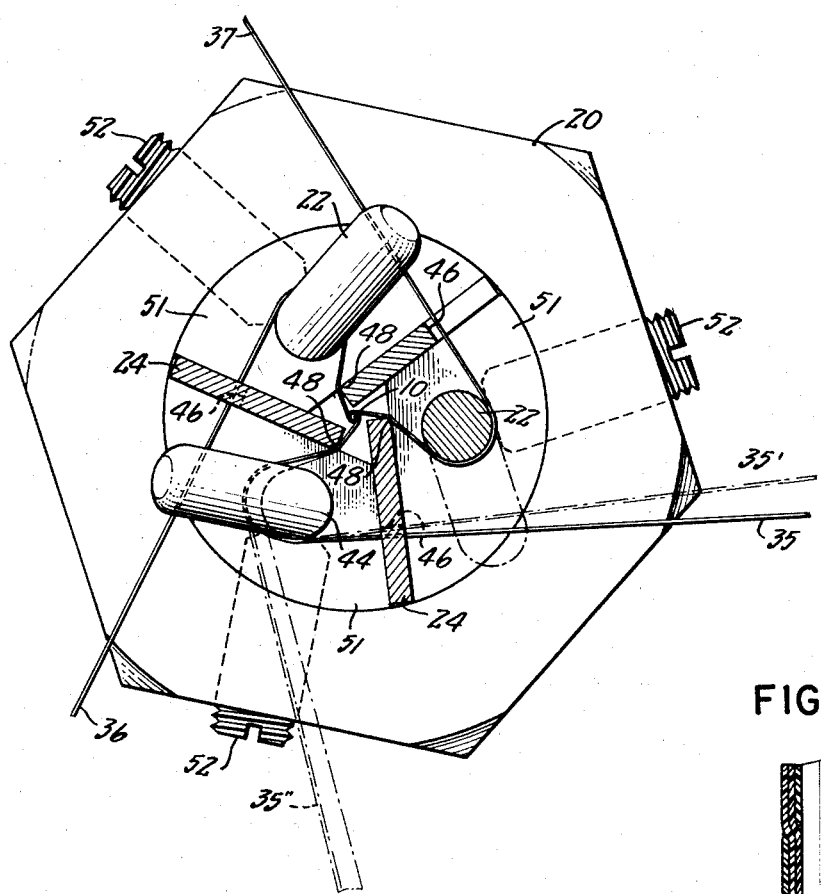
Figure 4 is a top view, on greatly enlarged scale and partially in cross section, taken generally along the line 4—4 in Figure 2.
Figure 5:
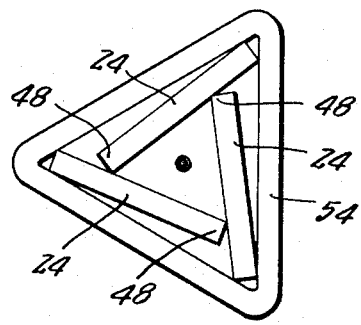
Figure 5 is a top view, on the same scale as Figure 4, taken along the line 5—5 in Figure 1, with the conductor and its insulation layer in cross section.

As shown in Figure 1, the electrical conductor 10, which is to be insulated, is fed upwardly through a hollow rotatably mounted shaft 11 supporting a rotatable turntable, generally indicated at 12 and snubbing, pre-stretching, and smoothing apparatus all included in a nose assembly, generally indicated at 14 (see also Figure 2).

The turntable 12 is fastened near the upper end of the rotatable shaft 11 by means of a set screw 16 set in the hub of the turntable. The nose piece assembly includes a hollow shank 18, with a hexagonal block 20 fastened to the top end of the shank. Three snubbing and pre-stretching bent pins 22 (see also Figure 4) and three long smoothing guide vanes 24 are clamped in the hexagonal block 20, and the whole assembly is held in the upper end of the shaft 11 by a set screw 26. The shaft and turntable are rotated in the direction of the arrow 28 by any suitable drive means diagrammatically illustrated at 30, which may conveniently be a sheave on the lower end of the shaft 11 driven by a V-belt from an electric motor.

As the turntable rotates the conductor 10 is pulled upwardly through the hollow shaft 11 and through the hollow shank 18 and the nose piece 14 by suitable tension means, diagrammatically illustrated at 32. Simultaneously, three separate insulation tapes 35, 36, and 37, respectively, are led upwardly through three tape guides 38, which revolve around the conductor at the same speed as the nose assembly 14. These guides are conveniently formed by tubular elements projecting up through the turntable 12 near its rim with the top ends of each tape guide spaced above the surface of the turntable. The tapes are of synthetic resin material and are supplied from supply means (not shown) which may be positioned conveniently beneath the turntable 12.

Preferably the tension in each tape as it passes up through its guide 38 is accurately controlled, for example, as shown and claimed in my copending application Serial No. 453,758, filed September 2, 1954.

To reduce any frictional drag between the three tapes 35, 36, and 37 and their respective guide tubes 38, a small pulley 40 having a concave arcuate tape guiding surface is mounted in the top of each guide tube 38 with its axle extending diametrically across the bore thereof. The pulleys 30 are mounted so that each tape runs freely over its pulley and in toward the center of the turntable. Preferably the axles of the pulleys 40 are turned slightly to lead its tape to a position ahead of the center of the turntable so that each tape feeds freely toward its respective pin 22, which are all offset from the turntable axis.

Each tape 35, 36, and 37 after leaving its pulley 40 is fed approximately radially inwardly, but with a slight lead in the direction of rotation of the nose assembly 14. Each tape passes around the outside of its respective bent guide pin 22 and then curves in underneath a knee 44 in its pin, as seen clearly by following the tape 35 in Figures 2 and 4. Each tape continues farther around its pin 26, feeding upwardly with increasing steepness under the knee 44. Each tape comes out from under the knee in a direction which is approximately 180° from its initial direction in approaching its pin. This substantial reversal of direction is seen most clearly in Figure 4 and produces a certain degree of snubbing action to tension the tape as it leaves the pin and is wrapped on the conductor 10. The amount of snubbing action is adjusted by loosening the set screw 26 and then turning the whole nose assembly 14 with respect to the turntable to cause the tapes to come in at a different angle with respect to the pins 22. The position shown in the drawings is approximately the position usually used when maximum snubbing action is desired, for the tapes are just clearing the cut-out regions 46 in the outer edges of the smoothing vanes 24. Occasionally, it may be desired to increase the snubbing action beyond the amount shown, in which case the nose assembly 14 (see Figure 4) is rotated clockwise relative to the turntable so that each tape receives slight additional tension by rubbing on the edge 46 as indicated by the phantom position 35' of the tape 35 and then passing almost a full 180° around the pin. Lesser degrees of snubbing from that shown are often used. The usual range of snubbing adjustments is with the tape changing direction by an angle in the range from about 120° to about 180°, but lesser amounts may be used with lighter tapes, extending down to about 60°. In general it is preferable to have only very slight initial tensions, all equal, in the tapes as they pass over pulleys 40. The additional slight accurately controlled tension supplied by the nose assembly is added thereto in the portions of the tape intermediate the respective pins 22 and the conductor 10. The upper edges of each tape are bent outward by the knees 44 beyond the lower edges and receive a slight pre-stretching action, for the upper edge portions of each tape overlie portions of the other tapes.

Figure 6:
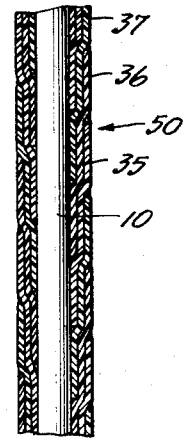
Figure 6 is an axial sectional view, on further enlarged scale, of a length of the insulated wire shown in Figure 3.

After the tapes leave the knees 44 they are pulled up across inner straight edges 48 of the guide vanes 24 which extend substantially parallel with the axis of the conductor 10. The tapes are smoothed out so that the planes of the widths of the tapes are all parallel to the axis of the wire, with the tapes being spaced apart equally around the conductor. At the edges 48 the tapes reverse direction by about 40° and are spaced from the conductor by a small distance commensurate with the conductor diameter. The tapes then are pulled tangentially around the wire. With three tapes the lower edge portions wrap on the bare conductor, the intermediate portions overlie the lower edges of the preceding tapes and the top portions overlie two thicknesses of tape, as seen clearly in Figure 3. The result is an accurate uniform alignment of all of the tapes to form a smooth impervious insulation layer 50, even prior to fusing, as seen in Figures 3 and 6, with all of the advantages discussed above. Assuming that the tape 35 is contrasting in appearance, for example blue with the tapes 36 and 37 being white, a neat appearing blue tracer is formed in the insulation layer 50.

As the tape 25 passes over the roller 40 its width extends in a direction generally parallel to the direction 28 but as the tapes are led inwardly around their guide pins 22, they are slowly twisted up toward the vertical. The amount of this twist depends upon the amount of snubbing and upon the angular position of the guide pins in the block 20, which can be adjusted. The lower end of each guide pin is held in a hole in a sector shaped insert 51 in the block 20 by means of set screws 52 in the faces of this block. Generally, the bent upper ends of the pins 22 are turned to be parallel with the adjacent face of the hexagonal block 20, and approximately parallel with the oncoming tape, as seen in Figure 4. However, they may be adjusted anywhere within a range from an extreme leading position wherein the ends of the pins 22 touch the rear face of the preceding vane 22 to a position approximately perpendicular to the adjacent face of the block 20 and approximately perpendicular to the oncoming tape. I have found that the pre-stretching effect on the upper edge of the tape is increased as the pins are turned toward a more leading position because of the increased amount of twist in the tape between the knees 44 and the edges 48.

The apparatus shown can be used for applying one, two, or three tapes and for various sizes of tapes. When only one or two tapes are being applied the speed of rotation of the turntable is correspondingly increased relative to the feed of the conductor 10, with the tape running more horizontally between the knee 44 and the edge 48. Also, when two tapes are applied, the relative positions of the two guide pins being used may be adjusted as by raising or twisting one of them to obtain a uniform overlap in the two tapes in spite of the asymmetrical tape feed.

It is preferable to use a nose assembly 14 having as many guide pins 22 as tapes being applied, with the pins symmetrically arranged, but the described apparatus is very flexible in application, and can be used with any number of tapes up to the number of pins as will be appreciated from the above examples. When wider tapes are being applied, the turntable is slowed down relative to the wire feed, and the tapes are allowed to run up farther along the edges 48 of the guide vanes 22.

In order to provide for a wide range in the vertical angles of approach of the tapes with respect to the conductor axis I provide vanes 24 having a considerable extension above the guide pins 22. The top ends of the vanes 22 are bound together by a triangular band 54 (Figure 6) with the top end of each vane lagging behind the position of its lower end, as seen in Figure 4.

The lower end of each vane 22 is clamped between two of the sector shaped inserts 51 leaving a triangular hole down through the top of the block 20. Preferably, the edges 48 are fairly sharp but with no burrs, while the recess 46 may be rounded.

For purposes of illustration, the wire 10 is assumed to be a Number 14 wire AWG having a diameter of approximately 64 mils and the insulation tape is unfused tape of polytetrafluorethylene 4 mils thick and 3/16 of an inch wide. The tensions in such tapes 35, 36 and 37 as they run past the edges 48 and onto the conductor is preferably in the range from 1 to 1.75 ounces (i.e. 85 to 150 pounds per square inch of cross section of the tape). With tapes and wire of this size, they angle upwardly and approach the wire 10 at an angle in the range from about 25° to about 40°. Among the many advantages of the nose assembly 14 is that it is adapted to feed tapes to the conductor 10 at a wide range in vertical angles of approach, thus accepting wide ranges in tape sizes. For example the tape may be fed at a vertical angle almost perpendicular to the wire or almost parallel to it. Where the number of tapes equals the number of pins the vertical angle at which each tape approaches the conductor 10 is the same, and this angle is controlled in accordance with the relative speeds of the wire 10 and turntable 12, by the adjustment of block 20 and pins 22 therein and by the tension in the tape.

In the nose assembly 14 described the pins 22 are 3/32 inches in diameter with their upper ends bent over at 65°. The vanes are 3/64 inches thick, 3/16 inches wide and 4 inches long.

The unfused polytetrafluorethylene tape described as an illustration of the types of synethic resin tapes, sometimes called film strips, with which this method and apparatus may be used, can be obtained commercially from Minnesota Mining and Manufacturing Company as "Scotch" "PTF" insulating film type "B" and is described in their sales bulletin No. E–PTF (33.5) LP. Other types, including fabric tapes may also be used, the advantages of the present apparatus being particularly apparent with plastic tapes of low tensile strength.

As used herein, "tape" is intended to include a length or a strip of material whether coated with other material, for example such as an adhesive agent, or not. "Conductor" includes wires whether bare or insulated, solid or stranded, and whether of circular or polygonal or of regular or irregular cross sections. The apparatus described is arranged to feed the wire vertically therethrough and so relative directions are described as "up," "vertical" or "horizontal" and the like. However, the axis of the wire may be arranged in any direction with a corresponding inclination of all of the apparatus and thus "up" or the equivalent is intended to mean in a direction parallel with the direction of the conductor through the apparatus and an "upper" portion or the equivalent means a part or portion displaced in said direction.

From the foregoing it is seen that I have provided plastic tape applying apparatus well adapted to accomplish the ends and objects hereinbefore set forth and to obtain the various advantages described above and with great flexibility in application to enable wide ranges of adjustment, and that various features of my invention may be used without the use of other corresponding features without departing from the scope of my invention.

What is claimed is:

1. Apparatus for applying plastic insulation tape to an electrical conductor comprising means to pull the conductor along a path, a plurality of symmetrically arranged spaced tape guide members revolvable around the path of the conductor at substantial radial distances from said path, angularly adjustable supporting mechanism, a plurality of symmetrically arranged bent pins each corresponding to a respective one of said members and forming prestretching guide elements for said tape, said bent pins having their shanks parallel with said path and supported by said supporting mechanism and revolvable around said path and positioned more closely to said path than said members, drive mechanism coupled to said members and supporting mechanism and adapted to revolve them around said path at the same speed with each of said bent pins leading a respective one of said members, said bent pins each having their upper ends bent forwardly away from the respective corresponding members forming rounded saddle-shaped surfaces facing forwardly and away from said path, the upper portions of said saddle-shaped surfaces being spaced farther from said path than the lower portions thereof, said upper portions of the saddle-shaped surfaces causing the upper edge of the tape to become stretched slightly with respect to the lower edge of the tape, said supporting mechanism being angular adjustable about the axis of revolution for adjusting the angle by which each of said bent pins leads the respective corresponding member, and a plurality of long tape smoothing vanes defining a plurality of symmetrically arranged aligning edges closely adjacent to said path and facing rearwardly, each of said aligning edges lagging a respective one of said elements, said aligning edges extending substantially parallel with said path, each of said smoothing vanes corresponding to a respective one of said bent pins, each tape passing from its guide member forwardly and under the saddle surface of the respective corresponding bent pin and reversing direction with its upper edge being stretched with respect to its lower edge, the tape then passing upwardly across the edge of the guide vane and tangentially in to the conductor with the stretched upper edge overlying the lower edge of another tape.

2. Apparatus for wrapping plastic insulation tape around a conductor comprising a rotatable structure having an axial opening defining a path for the conductor, rotating drive mechanism coupled to said structure, at least one tape-guiding member on said structure and spaced from said hole, a support carried by said rotatable structure adjacent to and surrounding said hole, said support being angularly adjustable in position on said structure concentric about the axis of revolution, at least one guide pin on said support closer to said path than such member, such pin having a shank extending approximately parallel with said path and a portion bent forward in the direction of rotation, and a guide vane on said support defining a smoothing edge intermediate said pin and said path and extending parallel with said path and facing at least partially in a direction opposite to the direction of the bend in said pin, the tape passing from said member forwardly and under the knee of the bent portion of the pin while reversing direction by approximately 180° as seen axially of the path and then passing upwardly and across the edge of the guide vane and onto the wire, the upper edge of the tape in passing under said knee becoming stretched slightly with respect to its lower edge, whereby the upper edge is adapted smoothly to overlie the lower edge of another tape on the conductor.

3. Apparatus for wrapping insulation tape around a conductor comprising a rotatable structure having an axial opening defining a path for the conductor, rotating drive mechanism coupled to said structure, at least one tape-guiding member on said structure and spaced from said hole, an inner assembly on said structure and adjustable in angular position with respect thereto, at least one guide pin on said inner assembly, such pin having a shank extending approximately parallel with said path and a bent portion inclined forwardly away from the member, said pin being adjustable in angular position on said assembly, a vane defining a smoothing edge intermediate said pin and said path and extending substantially parallel with said path, the tape passing from said guide member forwardly and around under the knee of the bent portion of the pin and reversing direction passing upwardly across the edge of the vane and then in to the conductor, the upper edge of the tape being stretched outwardly slightly with respect to its lower edge in passing around the pin under the knee of said forwardly inclined bent portion of the pin.

4. A nose piece assembly for applying plastic insulating tapes to a conductor comprising a rotatable base portion having an axial hole therethrough, a plurality of pins equally spaced around said hole on said base portion and having their shanks extending substantially parallel with the axis of said base portion, the free ends of said pains being curved over and being directed at least partially forward in the direction of rotation of said base portion, each of said pins being adjustable about its own axis for changing the angular position of their respective free ends with respect to the axis of the base portion, and an equal number of guide vanes on said base portion equally spaced around said hole and having edges facing at least partially rearwardly and extending up from said base above said pins near said axis and extending substantially parallel with said axis, each tape passing approximately 180° around its pin under the knee of the forwardly curved portion of the pin and upwardly across the edge of the vane and tangentially in to the conductor in helical wrapping relationship therewith.

5. An assembly as claimed in claim 4 and wherein said guide vanes have a length at least three times the length of the shanks of said guide pins.

6. An assembly as claimed in claim 4 and wherein said guide vanes have an axial length at least three times the length of the shanks of said guide pins, and wherein said guide vanes are recessed opposite the curved over portions of said guide pins.

References Cited in the file of this patent

UNITED STATES PATENTS

| | | |
|---|---|---|
| 495,085 | Cookson | Apr. 11, 1893 |
| 1,595,198 | Jenny | Aug. 10, 1926 |
| 1,748,995 | Reichelt et al. | Mar. 4, 1930 |
| 1,881,621 | Janicki | Oct. 11, 1932 |
| 1,914,164 | Rice | June 13, 1933 |
| 2,431,250 | Hill | Nov. 18, 1947 |
| 2,782,138 | Olson et al. | Feb. 19, 1957 |

FOREIGN PATENTS

| | | |
|---|---|---|
| 503,928 | Germany | July 31, 1930 |
| 668,452 | Great Britain | Mar. 19, 1952 |